United States Patent
Gupta (10) Patent No.: US 9,802,575 B2
(45) Date of Patent: Oct. 31, 2017

(54) VEHICLE WIPER SYSTEM

(71) Applicant: Nissan North America, Inc., Franklin, TN (US)

(72) Inventor: Balkishan Malay Gupta, Farmington Hills, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 39 days.

(21) Appl. No.: 15/045,640

(22) Filed: Feb. 17, 2016

(65) Prior Publication Data
US 2017/0232934 A1    Aug. 17, 2017

(51) Int. Cl.
| | | |
|---|---|---|
| *B60S 1/38* | (2006.01) | |
| *B60S 1/58* | (2006.01) | |
| *B60S 1/36* | (2006.01) | |
| *B60S 1/08* | (2006.01) | |
| *B08B 1/00* | (2006.01) | |
| *B60S 1/34* | (2006.01) | |

(52) U.S. Cl.
CPC ............ *B60S 1/0807* (2013.01); *B08B 1/005* (2013.01); *B60S 1/3402* (2013.01); *B60S 1/3404* (2013.01); *B60S 1/365* (2013.01); *B60S 1/3801* (2013.01); *B60S 1/583* (2013.01)

(58) Field of Classification Search
CPC .... B60S 1/3402; B60S 1/3404; B60S 1/3406; B60S 1/36; B60S 1/365; B60S 1/0807; B60S 1/58; B60S 1/583
USPC .............. 15/250.39, 250.21, 250.23, 250.13
See application file for complete search history.

(56) References Cited

U.S. PATENT DOCUMENTS

| | | | | |
|---|---|---|---|---|
| 2,591,091 A | * | 4/1952 | O'Connor ............... | B60S 1/365 15/250.23 |
| 2,607,944 A | * | 8/1952 | Turner ..................... | B60S 1/28 15/250.04 |
| 2,615,190 A | * | 10/1952 | Shaw .................... | B60S 1/3409 15/250.23 |
| 2,829,394 A | * | 4/1958 | Brigmon ............... | B60S 1/3404 15/250.23 |
| 5,228,167 A | | 7/1993 | Yang | |
| 5,301,383 A | * | 4/1994 | Suzuki ..................... | B60S 1/20 15/250.23 |

FOREIGN PATENT DOCUMENTS

| | | |
|---|---|---|
| CN | 201052769 Y | 4/2008 |
| CN | 101797913 B | 11/2011 |

* cited by examiner

*Primary Examiner* — Gary Graham
(74) *Attorney, Agent, or Firm* — Global IP Counselors, LLP (57) ABSTRACT

A vehicle wiper system includes a plurality of first sensor elements, an adjustable wiper, and a second sensor. The plurality of first sensor elements is configured to be disposed at a periphery of a vehicle window to form a boundary. The adjustable wiper has a distal end and a proximal end, and an adjustment mechanism that enables a distance between the distal end and the proximal end to change. The adjustable wiper is configured to travel along a windshield to define a wiper path. The second sensor element is disposed adjacent the distal end, and is configured to operate in conjunction with the first sensor element to adjust the adjustable wiper such that a distance between the distal end and the proximal end changes, and a distance between the distal end of the wiper and the boundary remains substantially consistent as the adjustable wiper travels along the wiper path.

14 Claims, 7 Drawing Sheets

FIG. 9

VEHICLE WIPER SYSTEM

BACKGROUND

Field of the Invention

The present invention generally relates to a vehicle wiper system. More specifically, the present invention relates to a vehicle wiper system that is capable of traveling along a wiper path that covers substantially all of a vehicle windshield.

Background Information

Conventional windscreen wipers or windshield wipers are devices used to remove rain, snow, ice and debris from a windscreen or windshield of a vehicle, such as a car, truck, train, watercraft and some aircraft. A conventional wiper generally includes a metal arm, pivoting at one end and with a long rubber blade attached to the other end. The arm is powered by a motor, such as an electric motor. The blade swings back and forth over the windshield glass, pushing water or other precipitation from its surface.

SUMMARY

It has been discovered that an adjustable wiper that is adjustable during a wiper operation can improve wiper coverage. In view of the state of the known technology, one aspect of the present disclosure is to provide a vehicle wiper system including a plurality of first sensor elements, an adjustable wiper, and a second sensor. The plurality of first sensor elements is configured to be disposed at a periphery of a vehicle window to form a boundary. The adjustable wiper has a distal end and a proximal end, and an adjustment mechanism that enables a distance between the distal end and the proximal end to change. The adjustable wiper is configured to travel along the window to define a wiper path. The second sensor element is disposed adjacent the distal end, and is configured to operate in conjunction with the first sensor element to adjust the adjustable wiper such that a distance between the distal end and the proximal end changes, and a distance between the distal end of the wiper and the boundary remains substantially consistent as the adjustable wiper travels along the wiper path.

Another aspect of the present disclosure is to provide a method of wiping an area of a vehicle windshield, the method including operating an adjustable wiper, determining a distance of a distal end of the adjustable wiper from a periphery of a vehicle window using a detector system, and adjusting a distance of the distal end from the periphery of the vehicle window to maintain a predetermined distance between the distal end of the adjustable wiper and the periphery of the vehicle window while the adjustable wiper is in operation, such that the predetermined distance remains substantially consistent as the adjustable wiper travels along a wiper path.

Another aspect of the present disclosure is to provide a vehicle wiper system including a plurality of first sensor elements, an adjustable wiper, a second sensor, and a controller. The plurality of first sensor elements is configured to be disposed at a periphery of a vehicle window so as to form a boundary. The adjustable wiper has a distal end and a proximal end, and has an adjustment mechanism that enables a distance between the distal end and the proximal end to change. The second sensor element is disposed adjacent the distal end of the adjustable wiper blade, and is configured to communicate with the plurality of first sensor elements. The controller is in communication with the second sensor, and is programmed to determine the distance between the second sensor element and each of the first sensor elements, and is programmed to adjust the adjustable wiper such that a distance between the distal end and the proximal end changes to maintain a predetermined distance between the distal end and the boundary of the vehicle window during operation of the vehicle wiper system, such that the predetermined distance remains substantially consistent as the adjustable wiper travels along a wiper path.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Referring initially to FIGS. 1-4, a vehicle 10 including an adjustable wiper system 12 is illustrated in accordance with a first embodiment. The adjustable wiper system 12 can include a plurality of first sensor elements 14, an adjustable wiper 16, a second sensor element 18, and a controller 20.

The controller or control unit 20 preferably includes a microcomputer with a control program that controls the adjustable wiper 16 as discussed below. The controller 20 can also include other conventional components such as an input interface circuit, an output interface circuit, and storage devices such as a ROM (Read Only Memory) device and a RAM (Random Access Memory) device. The microcomputer of the controller 20 is programmed to control the adjustable wiper 16. The memory circuit stores processing results and control programs such as ones for the adjustable wiper 16 operation that are run by the processor circuit. The controller 20 is operatively coupled to the plurality of first sensor elements 14, the adjustable wiper 16, and the second sensor element 18 in a conventional manner. The internal RAM of the controller 20 stores statuses of operational flags and various control data. The controller 20 is capable of selectively controlling any of the components of the adjustable wiper system 12 in accordance with the control program. It will be apparent to those skilled in the art from this disclosure that the precise structure and algorithms for the controller 20 can be any combination of hardware and software that will carry out the functions of the present invention.

As shown in FIGS. 4-7, the adjustable wiper 16 preferably includes a first wiper part 22, a second wiper part 24, and an adjustment mechanism 26. The second wiper part 24 is configured to move relative to the first wiper part 22. In particular, the first wiper part 22 has a holding bracket 21 that has a first (proximal) end 28 and a second end 30, the holding bracket 21 being attached at a pivot point 32 via an arm 23 so to enable the adjustable wiper 16 to pivot therearound. The adjustable wiper 16 is pivoted about the pivot point 32 via a motor 34 as is known in the art.

The first wiper part 22 includes a first wiper blade 36 attached to the holding so as to be capable of being disposed adjacent the vehicle window 40, and such that the first wiper blade 36 is capable of contacting the window 40. The first wiper blade 36 is preferably rubber or any other suitable material for removing participation or other material from the window 40.

The second wiper part 24 is disposed adjacent the first wiper part 22 and has a holding bracket 25 that has a first end 42 and a second (distal) end 44. In one embodiment, the second wiper part 24 is moveably attached to the first wiper part 22. In particular, the second wiper part 24 can have an attachment portion 46 that overlies a portion 48 of the first wiper part 22 and is capable of sliding relative thereto.

A second wiper blade 50 is attached to the second wiper part 24 and is configured to contact the window 40. The second wiper blade 50 is preferably rubber or any other suitable material for removing participation or other material from the window 40.

Figure 5:
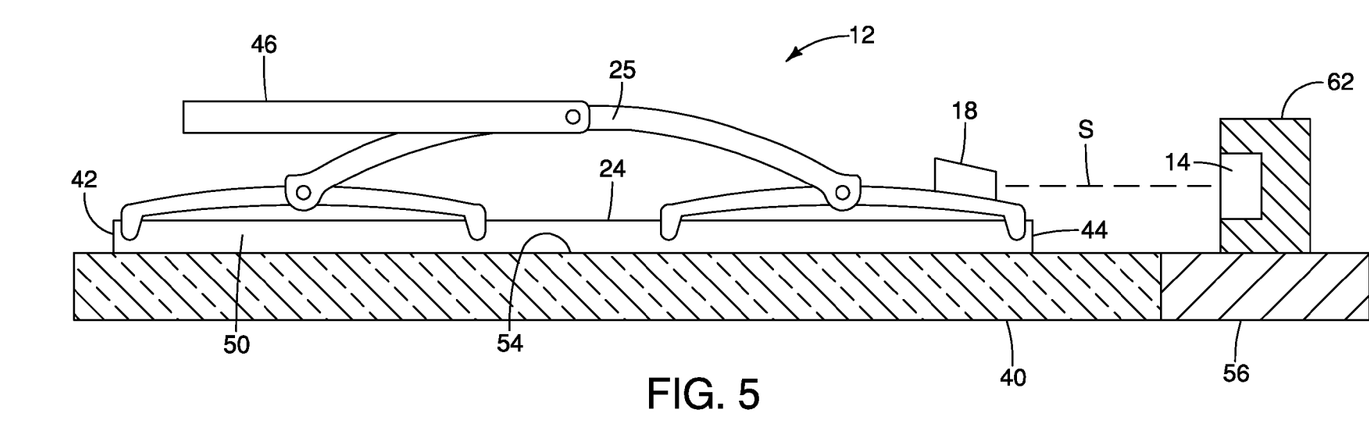
FIG. 5 is a partial schematic side elevational view of the adjustable wiper system shown in FIG. 1

The second wiper part 24 has a sensor element 18 disposed adjacent the second end 44 thereof. The sensor element 18 can be any suitable sensor, such as an infrared sensor, a laser and a photo sensor. In other words, the sensor element 18 can be any suitable device capable of detecting another device or operating in a detector or sensor system. The sensor element 18 is disposed on the second wiper part 24 so that it is capable of transmitting a signal S in a direction generally parallel to a surface 54 of the window 40. Accordingly, the sensor element 18 will transmit a signal that is received by the plurality of sensor elements 14 disposed along the periphery P or boundary 56 of the window 40.

Figures 6, 7:
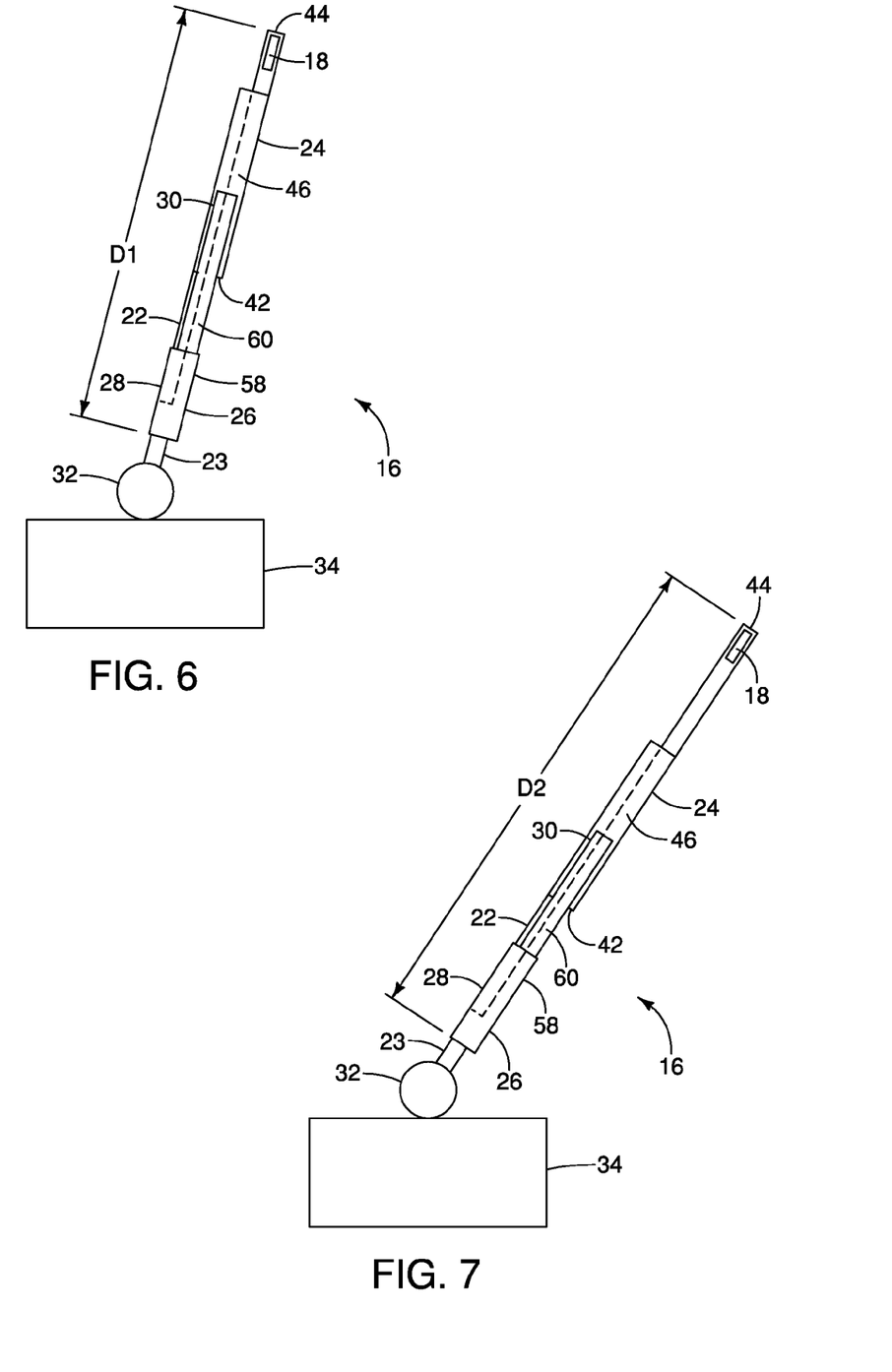
FIG. 6 is a view of the adjustable wiper of FIG. 4 in a first position.
FIG. 7 is a view of the adjustable wiper of FIG. 4 in a second extended position.

The adjustment mechanism 26 preferably includes an adjustment motor 58 having an adjustment arm 60 connected to the attachment portion 46 of the second wiper part 24. The adjustment arm 60 extends from the attachment portion 46 of the second wiper part 24 to the adjustment mechanism 26. The adjustment motor 58 is configured to extend and retract the adjustment arm 60 such that the distance between the second end 44 of the second wiper part 24 and the first end 28 of the first wiper part 22 changes. As shown in FIGS. 6 and 7, the adjustment mechanism 26 can be connected to the first wiper part 22, but it is noted that the adjustment mechanism 26 can be disposed in any suitable position that would enable the second wiper part 24 to be adjusted or moved relative to the first wiper part 22.

Figure 1:
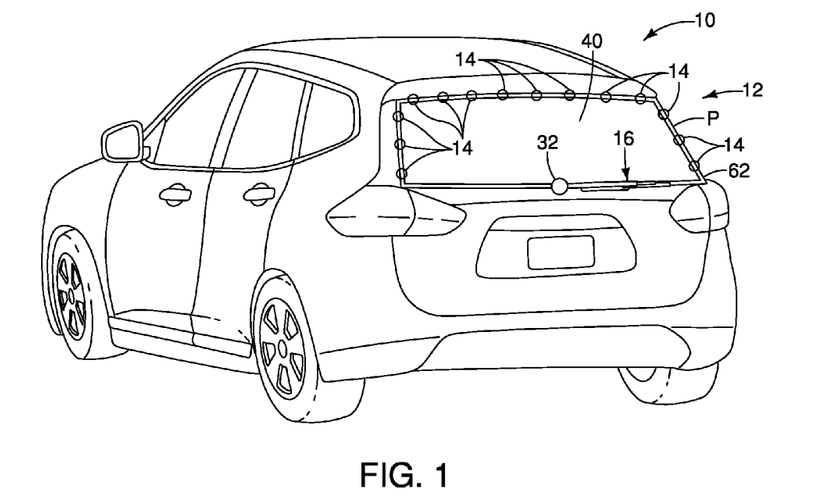
FIG. 1 is a rear perspective view of a vehicle having an adjustable wiper system according to an embodiment.
Figure 2:
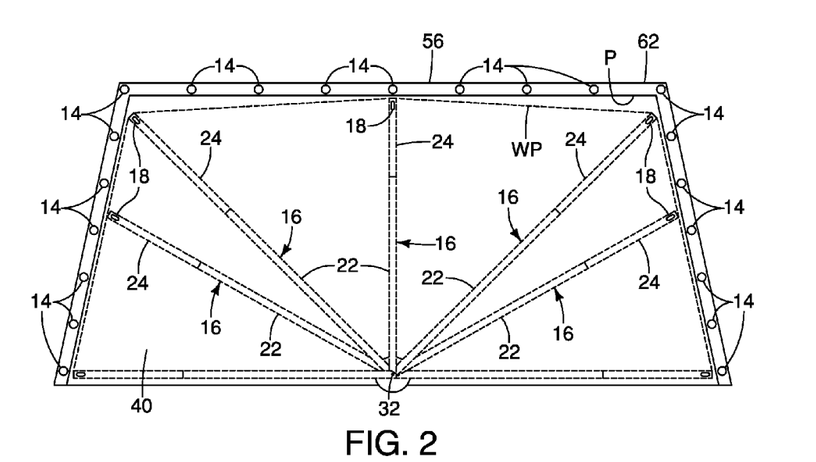
FIG. 2 is an elevational view of the vehicle window shown in FIG. 1 illustrating the wiper path of the adjustable wiper system of FIG. 1.

As shown in FIG. 2, the plurality of sensor elements 14 can be disposed in any manner along the periphery P of the window 40. The plurality of sensor elements 14 can be any type of sensors. For example, each of the plurality of sensor elements 14 can be an infrared sensor, a laser and a photo sensor, or some receiving sensor to receive such a signal. In other words, each of the plurality of sensor elements 14 can be any suitable device capable of detecting another device or operating in a detector or sensor system.

The plurality of sensor elements 14 and the sensor element 18 disposed on the second wiper part 24, preferably form a sensor system that communicates with the controller 20. That is, in one embodiment, the sensor element 18 sends a signal that is received by the plurality of sensor elements 14. Alternately, the plurality of sensor elements 14 can send a signal that is received by the sensor element 18. Further, either the plurality of sensor elements 14 or the sensor element 18 can send a signal that is reflected by the other of the plurality of sensor elements 14 or the sensor element 18 and received by the same sensor that sent the signal S.

The plurality of sensor elements 14 can include any suitable number of sensors that can sense or detect a signal S from the sensor element 18 disposed on the second wiper part 24. In other words, the plurality of sensor elements 14 can be disposed any suitable interval from each other. The interval or distance between sensors can be consistent, or inconsistent, or in any desired manner.

In one embodiment, the plurality of sensor elements 14 is configured to be disposed within permanent or semi-permanent a trim element 62 of the vehicle 10. In this embodiment, each of the sensors 14 are permanently or semi-permanently fixed to vehicle 10. The trim element 62 of the vehicle 10 is generally disposed so as to extend in a direction transverse or perpendicular from the surface 54 of the window 40. Accordingly, the plurality of sensor elements 14 is disposed in a position above or in a different plane from the surface 54 of the window 40. In this embodiment, the sensor element 18 disposed on the second wiper part 24 can send or receive a signal S to each of the plurality of sensor elements 14 without obstruction.

Alternatively, the trim element 62 can be detachable. In other words, the plurality of first sensor elements 14 can be disposed within a sensor attaching mechanism configured to be removably attached adjacent the periphery P of the window 40. Similarly to the embodiment described above, in this embodiment the plurality of sensor elements 14 are disposed in a position above or in a different plane from the surface 54 of the window 40. In this embodiment, the sensor element 18 disposed on the second wiper part 24 can send or receive a signal S to each of the plurality of sensor elements 14 without obstruction.

Figure 3:
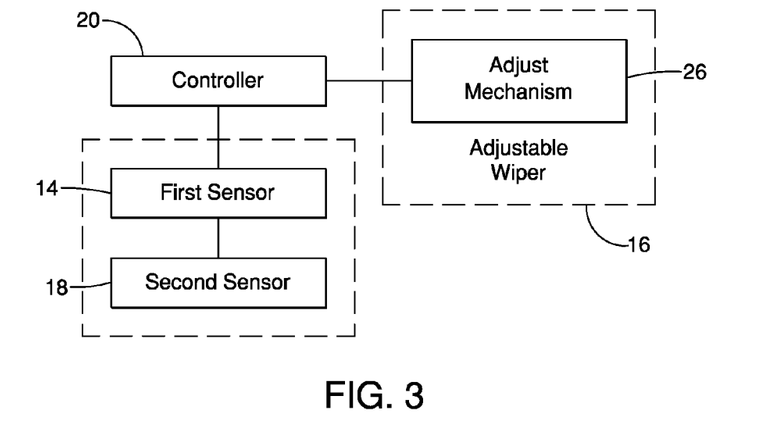
FIG. 3 is a schematic diagram illustrating the adjustable wiper system of FIG. 1
Figure 4:
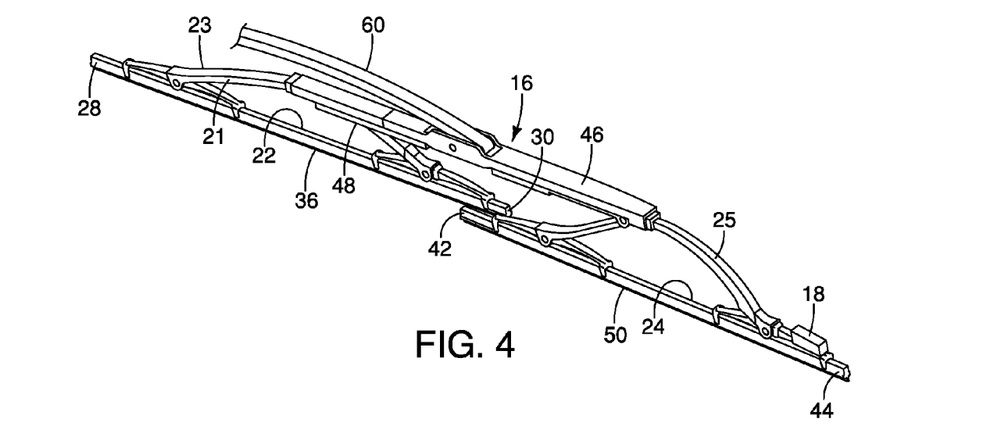
FIG. 4 is a top perspective view of the adjustable wiper shown in FIG. 1.

Accordingly, as shown in FIGS. 2 and 3, in one embodiment, the controller 20 is in communication with the adjustable mechanism 26 of the adjustable wiper 16 and the sensor element 18 disposed on the second wiper part 24 of the adjustable wiper 16 (or the plurality of sensor elements 14). In this embodiment, the controller 20 receives a signal from one of the sensor element 18 and the plurality of sensor elements 14 and is programmed to determine the distance therebetween. The controller 20 then can transmit a signal S to the adjustment mechanism 26 to move the second wiper part 24 such that the second end 44 of the second wiper part 24 is a predetermined distance from the boundary 56 of the window 40.

Accordingly, as the adjustable wiper 16 moves along a wiper path WP, the adjustable wiper system 12 continually adjusts the distance between the second end 44 of the second wiper part 24 and the first end 28 of the first wiper part. Moreover, the adjustable wiper system 12 maintains a generally consistent distance between the second end 44 of the second wiper part 24 and the boundary 56.

Thus, as specifically shown in FIG. 6, the distance between the first end 28 of the first wiper part 22 and the second end 44 of the second wiper part 24 is a first distance D1. In FIG. 7, the distance between the first end 28 of the first wiper part 22 and the second end 44 of the second wiper part 24 is a second distance D2. The second distance D2 is different from the first distance D1. Moreover, as the adjustable wiper 16 moves along a wiper path WP the distance between the second end 44 of the second wiper part 24 and the first end 28 of the first wiper part 22 is different as the adjustable wiper 16 moves between each of the sensors 14 in the plurality of sensors 14.

Figure 8:
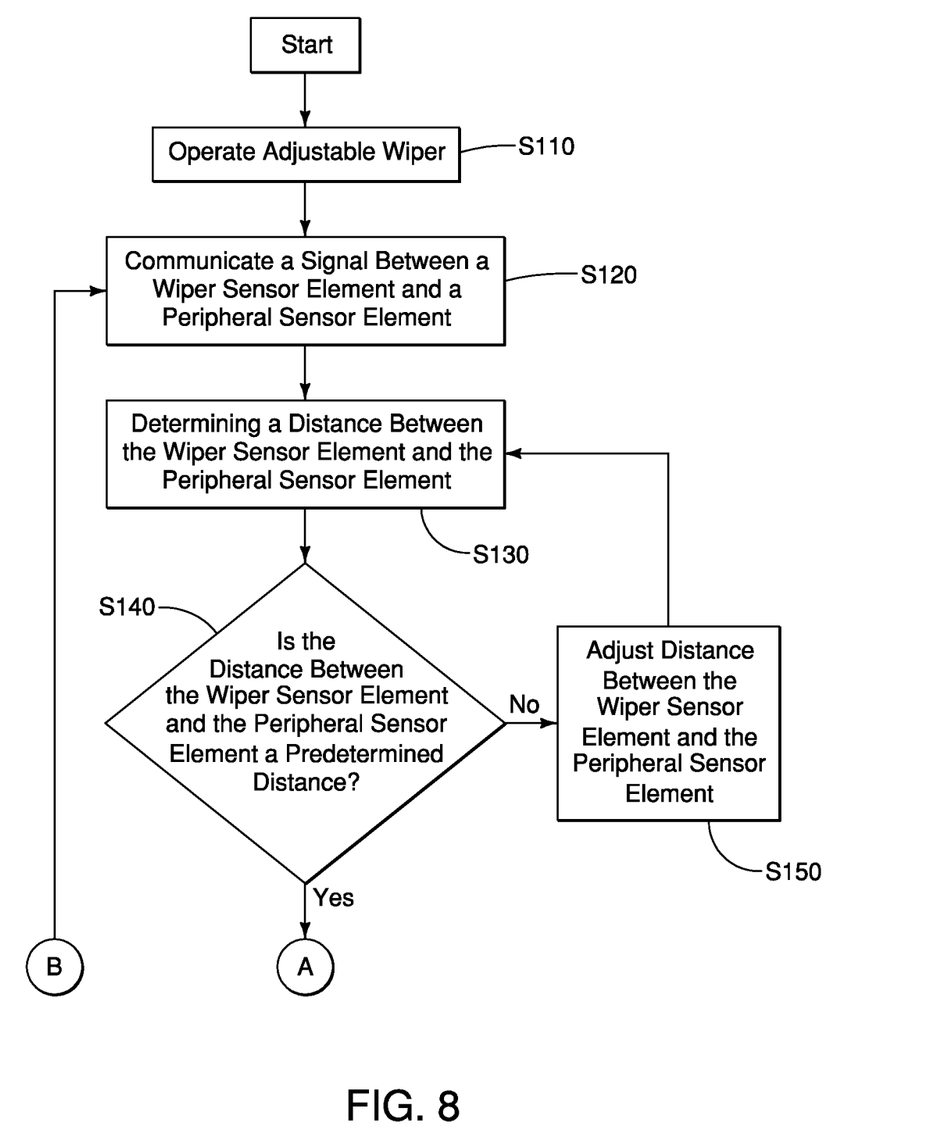
FIGS. 8 and 9 are flow charts illustrating the procedure for determining the length between the ends of the adjustable wiper shown in FIGS. 6 and 7.
Figure 9:
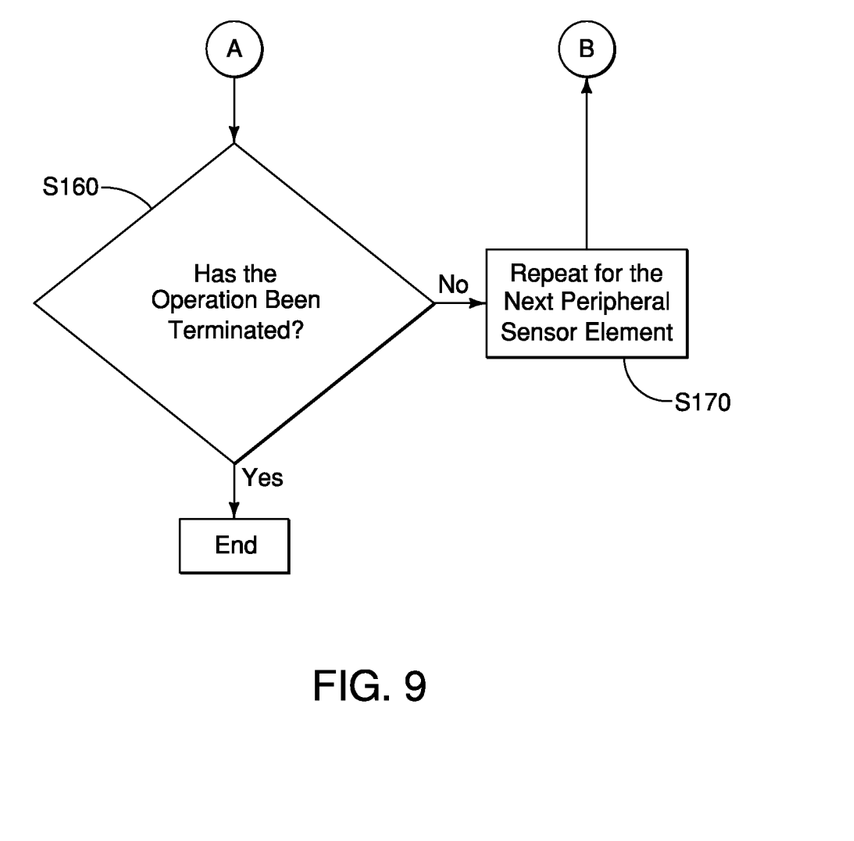

Turning to FIGS. 8 and 9, a flow chart is shown illustrating the operation of the adjustable wiper 16. In step S110, the adjustable wiper 16 is operated. This operation can either be manually, by the vehicle operator, or automatically, by the vehicle computer control system, as is known in the art. Prior to the operation being initiated, the distance between the second end 44 of the second wiper part 24 and the first end 28 of the first wiper part 22 of the adjustable wiper system 12 can be a preset distance (e.g., a shortest distance or any other suitable distance). When the operation is initiated, the distance between the second end 44 of the second wiper part 24 and the first end 28 of the first wiper part 22 can be changed to a predetermined distance or the controller can extend the second end 44 of the second wiper 24 to the predetermined distance between the sensor elements 14 and the sensor element 18, or any other suitable distance.

As the adjustable wiper 16 moves along a wiper path WP (as shown in FIG. 2), the sensor element 18 communicates a signal S to the one of the plurality of sensor elements 14 at the boundary 56 or the periphery P of the window 40, in step S120. The controller 20 then, in step S130, determines a distance between the sensor element 18 disposed on the adjustable wiper 16 and the plurality of sensor elements 14. In step S140, the controller 20 determines whether the distance between the sensor element 18 and the sensor element at the periphery of the window 40 is a predetermined distance.

If the distance between the sensor element 18 and the sensor element 14 at the periphery P of the window 40 is not a predetermined distance, the controller 20 activates the motor 58 in the adjustment mechanism 26 to adjust the distance between the second end 44 of the second wiper part 24 and the first end 28 of the first wiper part 22 to correspond to the predetermined distance in step S150. The controller 20 then rechecks the distance between the sensor element 18 and the sensor element 14 at the periphery P of the window 40.

If the distance between the sensor element 18 and the sensor element 14 at the periphery P of the window 40 is a predetermined distance, the sensor element 18 determines whether the operation has been terminated in step S160. If the operation has not been terminated, the controller 20 determines the distance between the sensor element 18 and the next sensor element 14 at the periphery P of the window 40 in step S170, to determine whether the distance between the sensor element 18 and the sensor element 14 at the periphery P of the window 40 is the predetermined distance, and adjusts accordingly, as describe above. Thus, as the wiper moves from a first sensor element of the plurality of sensor elements 14 to a second sensor of the plurality of sensor elements 14, along the wiper path WP, the sensor element maintains at least the predetermined distance between the sensor element 18 and a first sensor of the plurality of sensor elements 14. As the sensor element 18 leaves the first sensor element of the plurality of first sensors elements 14, communication is terminated. Then, as the sensor element 18 approaches the second sensor element of the plurality of sensor elements 14, communication will occur between these sensor elements. Accordingly, once this communication occurs, the controller adjusts the distance between the second sensor element of the plurality of sensor elements 14 and the sensor element 18 to the predetermined distance. The controller 20 performs this function for each of the sensor elements 14 in the plurality of sensor elements as the adjustable wiper 16 continues a wiper path WP along the window 40 until the operation is terminated.

Once the operation is terminated and the adjustable wiper 16 returns to a home or origination position, the adjustable wiper can retract to the shortest configuration or any other suitable configuration. In other words, once the wiper operation has been terminated, the adjustable wiper can be set into a position in which the distance between the between the second end 44 of the second wiper part 24 and the first end 28 of the first wiper part 22 is at a shortest distance.

Thus, the sensor element 18 and the plurality of sensor elements 14 are configured to operate in conjunction to adjust the adjustable wiper 16 such that a distance between the second end 44 of the second wiper part 24 and the first end 28 of the first wiper part 22 changes, and a distance between the second end 44 of the second wiper part 24 of the wiper and the boundary 56 of the window 40 remains substantially consistent as the adjustable wiper 16 travels along the wiper path WP. As can be understood substantially consistent will allow for discrepancies as the wiper moves between sensors 14. Additionally, the substantially consistent distance will take into account areas of the window that will be more difficult to cover, such as corners. Such an adjustable wiper 16 increases wiper coverage on the window 40, increasing driver visibility and increasing safety.

Figure 10:
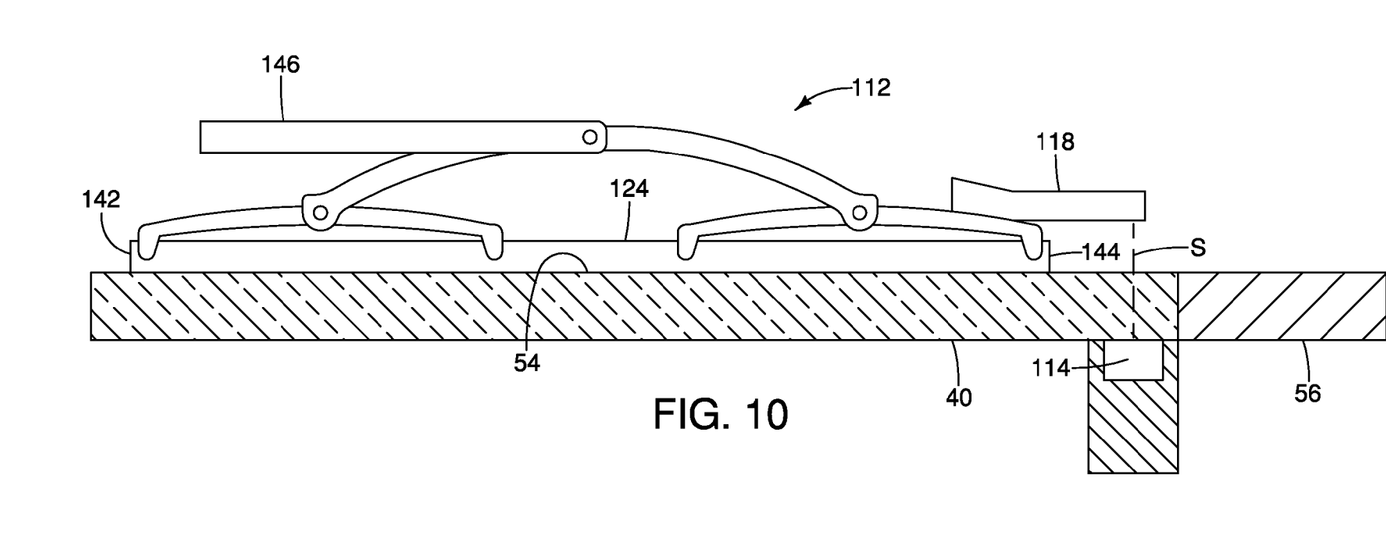
FIG. 10 is a partial schematic side elevational view of the adjustable wiper system according to a second embodiment.

Referring now to FIG. 10, an adjustable wiper system 112 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

FIG. 10, only illustrates the modifications in the adjustable wiper system 112, and the remainder of the adjustable wiper system 112 remains the same as described above. In this embodiment, the sensor element 118 is disposed at the second end 144 of the second wiper part 124 so as to be capable of transmitting a signal S or receiving a signal S in a direction perpendicular to the surface 54 of the window 40. In this embodiment, the plurality of sensor elements 114 can be disposed under the window surface 54, so as to be capable of communicating with the sensor element 118 disposed on the second wiper part 124 that is capable of sending or receiving a signal S in a direction substantially perpendicular (or generally transverse) to the surface 54 of the window 40.

In this embodiment, the controller 20 is programmed to adjust the second end 144 of the second wiper part 124 until the sensor 14 in the plurality of sensor elements 114 receives the signal S from the sensor element 118, thus confirming that the second end 144 of the second wiper part 124 is the appropriate distance from the first end 28 of the first wiper part 22 and/or at a predetermined distance from the boundary 56 of the window 40.

An adjustable wiper system 112 in accordance with the embodiments described herein is capable of establishing a wiper path that covers substantially the entirety of the window 40 and improves operator visibility. Thus, the embodiments described herein increase the safety of the operation of the vehicle 10 and the passengers carried therein.

It is noted that the adjustability of the adjustable wiper can be affected in any suitable manner. For example, the adjustment mechanism can be pump-action wiper blade (air, fluid, similar to a piston), built within the blade, a vacuum (retract)/blower (extend) mechanism built within the blade, 2 wiper blades (1 fixed, 1 extendable), staggered yet connected together via an electro-mechanical sliding mechanism that extends/retracts the extendable blade.

While the adjustable wiper system 12 is illustrated on the rear window 40 of the vehicle 10, it is noted that the adjustable wiper system 12 can be disposed on a transparent surface (e.g., front, rear, side, headlights), or semi-transparent surface desired.

The motor 34 and motor 58 are conventional components that is well known in the art. Since motors are well known in the art, this structure will not be further discussed or illustrated in detail herein. Rather, it will be apparent to those skilled in the art from this disclosure that the components can be any type of structure and/or programming that can be used to carry out the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," or "element" when used in the singular can have the dual meaning of a single part or a plurality of parts. Also as used herein to describe the above embodiment, directional terms, such as "transverse", as well as any other similar directional terms refer to those directions of a vehicle equipped with the Adjustable Wiper system. Accordingly, these terms, as utilized to describe the present invention should be interpreted relative to a vehicle equipped with the Adjustable Wiper system.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree, such as "substantially" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle wiper system, comprising:
  a plurality of first sensor elements configured to be disposed at a periphery of a vehicle window to form a boundary;
  an adjustable wiper having a distal end and a proximal end, and having an adjustment mechanism that enables a distance between the distal end and the proximal end to change, the adjustable wiper configured to travel along the vehicle window to define a wiper path; and
  a second sensor element disposed adjacent the distal end of the adjustable wiper blade, and configured to operate in conjunction with the first sensor element to adjust the adjustable wiper such that a distance between the distal end and the proximal end changes, and a distance between the distal end of the wiper and the boundary remains substantially consistent as the adjustable wiper travels along the wiper path.

2. The vehicle wiper system according to claim 1, wherein the second sensor is configured to transmit a signal in a direction generally parallel to a surface of the vehicle window.

3. The vehicle wiper system according to claim 1, wherein the second sensor is one of an infrared sensor, a laser, and a photo sensor.

4. The vehicle wiper system according to claim 1, wherein the first sensor is one of an infrared sensor, a laser, and a photo sensor.

5. The vehicle wiper system according to claim 1, wherein the plurality of first sensor elements are configured to be disposed within a trim element of the vehicle.

6. The vehicle wiper system according to claim 1, wherein the plurality of first sensor elements are disposed within a sensor attaching mechanism configured to be removably attached adjacent the periphery of the vehicle window.

7. The vehicle wiper system according to claim 1, wherein the adjustment mechanism is configured to move the distal end of the adjustable wiper in a longitudinal direction.

8. The vehicle wiper system according to claim 1, wherein the adjustable wiper includes a first wiper part and a second wiper part, and the second wiper part is configured to move relative to the first wiper part.

9. The vehicle wiper system according to claim 1, wherein the adjustable wiper includes a wiper contact blade disposed between the distal end and the proximal end and configured to contact the window, the wiper contact blade being capable of adjusting a contact length thereof during a wiper operation.

10. A vehicle wiper system, comprising:
  a plurality of first sensor elements configured to be disposed at a periphery of a vehicle window so as to form a boundary;

an adjustable wiper having a distal end and a proximal end, and having an adjustment mechanism that enables a distance between the distal end and the proximal end to change;

a second sensor element disposed adjacent the distal end of the adjustable wiper blade, and configured to communicate with the plurality of first sensor elements; and a controller in communication with the second sensor, and programmed to determine the distance between the second sensor element and each of the first sensor elements, and programed to adjust the adjustable wiper such that a distance between the distal end and the proximal end changes to maintain a predetermined distance between the distal end and the boundary of the vehicle window during operation of the vehicle wiper system, such that the predetermined distance remains substantially consistent as the adjustable wiper travels along a wiper path.

11. The vehicle wiper system according to claim 10, wherein
the plurality of first sensor elements are configured to be disposed within a trim element of the vehicle.

12. The vehicle wiper system according to claim 10, wherein
the plurality of first sensor elements are disposed within a sensor attaching mechanism configured to be removably attached adjacent the periphery of the vehicle window.

13. The vehicle wiper system according to claim 10, wherein
the adjustable wiper includes a first wiper part and a second wiper part, and the second wiper part is configured to move relative to the first wiper part in a longitudinal direction of the adjustable wiper.

14. The vehicle wiper system according to claim 10, wherein the adjustable wiper includes a wiper contact blade disposed between the distal end and the proximal end and configured to contact the window, the wiper contact blade being capable of adjusting a contact length thereof during a wiper operation.

* * * * *